(12) United States Patent
Noiri

(10) Patent No.: US 9,340,116 B2
(45) Date of Patent: May 17, 2016

(54) SELF-PROPELLED ELECTRONIC DEVICE

(71) Applicant: Sharp Kabushiki Kaisha, Osaka-shi, Osaka (JP)

(72) Inventor: Junichi Noiri, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/370,818

(22) PCT Filed: Nov. 19, 2012

(86) PCT No.: PCT/JP2012/079967
§ 371 (c)(1),
(2) Date: Jul. 7, 2014

(87) PCT Pub. No.: WO2013/108479
PCT Pub. Date: Jul. 25, 2013

(65) Prior Publication Data
US 2015/0151646 A1  Jun. 4, 2015

(30) Foreign Application Priority Data

Jan. 17, 2012  (JP) .................................. 2012-007398

(51) Int. Cl.
*B60L 9/00* (2006.01)
*B60L 11/18* (2006.01)
(Continued)

(52) U.S. Cl.
CPC ............. *B60L 11/1833* (2013.01); *A47L 9/009* (2013.01); *A47L 9/2805* (2013.01); *B60L 1/003* (2013.01);
(Continued)

(58) Field of Classification Search
CPC ....... A47L 9/009; A47L 9/2805; B60L 1/003; B60L 11/1824; B60L 11/1833; B60L 11/1861; B60L 11/1862; B60L 15/20; G05D 1/0225
See application file for complete search history.

(56) References Cited

U.S. PATENT DOCUMENTS 6,142,252 A * 11/2000 Kinto ..................... G01S 17/89
180/204
6,764,373 B1 * 7/2004 Osawa ................... B25J 19/005
180/169
(Continued)

FOREIGN PATENT DOCUMENTS

JP  04-210704 A  7/1992
JP  07-063114 A  3/1995
(Continued)

OTHER PUBLICATIONS

Official Communication issued in International Patent Application No. PCT/JP2012/079967, mailed on Jan. 22, 2013.

*Primary Examiner* — Calvin Cheung
(74) *Attorney, Agent, or Firm* — Keating & Bennett, LLP

(57) ABSTRACT

There is provided a self-propelled electronic device that is supplied with power from a charging base installed in a predetermined position and automatically travels to a position away from the charging base, the self-propelled electronic device including: a travelling control unit that makes the self-propelled electronic device move automatically by controlling the rotation of a wheel; a rechargeable battery that supplies power for performing travelling control during the automatic travelling; a charging base searching unit that searches for the position of the charging base; and a control unit; wherein, when the control unit determines that returning to the charging base is required, the control unit performs return processing by which the self-propelled electronic device is made to come to rest and then rotate in a resting state by the travelling control unit and, when the charging base searching unit searches for the direction in which the charging base lies and detects the direction in which the charging base lies, the self-propelled electronic device moves in the direction in which the charging base lies.

6 Claims, 10 Drawing Sheets

(51) Int. Cl.
*G05D 1/02* (2006.01)
*A47L 9/00* (2006.01)
*A47L 9/28* (2006.01)
*B60L 15/20* (2006.01)
*B60L 1/00* (2006.01)

(52) U.S. Cl.
CPC ......... *B60L 11/1824* (2013.01); *B60L 11/1861* (2013.01); *B60L 11/1862* (2013.01); *B60L 15/20* (2013.01); *G05D 1/0225* (2013.01); *A47L 2201/022* (2013.01); *A47L 2201/04* (2013.01); *A47L 2201/06* (2013.01); *B60L 2200/40* (2013.01); *B60L 2230/10* (2013.01); *G05D 2201/0215* (2013.01); *Y02T 10/705* (2013.01); *Y02T 10/7005* (2013.01); *Y02T 10/7044* (2013.01); *Y02T 10/7088* (2013.01); *Y02T 10/7258* (2013.01); *Y02T 90/12* (2013.01); *Y02T 90/121* (2013.01); *Y02T 90/14* (2013.01)

(56) References Cited

U.S. PATENT DOCUMENTS

| | | | | |
|---|---|---|---|---|
| 7,787,991 | B2 * | 8/2010 | Jeung | G05D 1/0214 15/319 |
| 8,798,834 | B2 * | 8/2014 | Jeong | H02J 7/0004 701/22 |
| 2004/0025268 | A1 * | 2/2004 | Porat | E04H 4/1654 15/1.7 |
| 2004/0073337 | A1 * | 4/2004 | McKee | G05D 1/0251 700/245 |
| 2004/0193339 | A1 * | 9/2004 | Hulden | G05D 1/0272 701/23 |
| 2007/0137153 | A1 | 6/2007 | Oh et al. | |
| 2008/0140254 | A1 | 6/2008 | Jeung et al. | |
| 2008/0174268 | A1 * | 7/2008 | Koo | A47L 9/2805 320/109 |
| 2008/0276408 | A1 * | 11/2008 | Gilbert, Jr. | A47L 11/34 15/320 |
| 2009/0281661 | A1 * | 11/2009 | Dooley | B60L 3/106 700/258 |
| 2009/0315501 | A1 * | 12/2009 | Li | A01D 34/008 318/568.12 |
| 2011/0202175 | A1 * | 8/2011 | Romanov | A47L 11/4011 700/250 |
| 2011/0234153 | A1 * | 9/2011 | Abramson | A01D 34/008 320/107 |
| 2011/0295420 | A1 * | 12/2011 | Wagner | G05D 1/0225 700/245 |
| 2012/0125363 | A1 * | 5/2012 | Kim | A47L 9/28 134/6 |
| 2012/0296511 | A1 * | 11/2012 | More | G05D 1/0225 701/26 |
| 2013/0056032 | A1 * | 3/2013 | Choe | A47L 9/0488 134/18 |
| 2014/0121881 | A1 * | 5/2014 | Diazdelcastillo | A01D 42/00 701/23 |

FOREIGN PATENT DOCUMENTS

| | | |
|---|---|---|
| JP | 08-194539 A | 7/1996 |
| JP | 09-282036 A | 10/1997 |
| JP | 2000-047728 A | 2/2000 |
| JP | 2004-195215 A | 7/2004 |
| JP | 2007-167617 A | 7/2007 |
| JP | 2008-146617 A | 6/2008 |
| JP | 2010-257318 A | 11/2010 |

* cited by examiner

FIG. 8
(a)
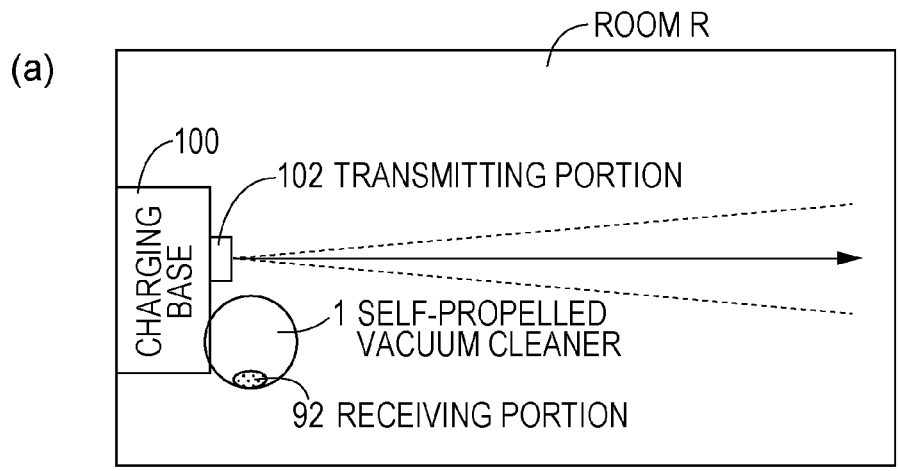
(b)
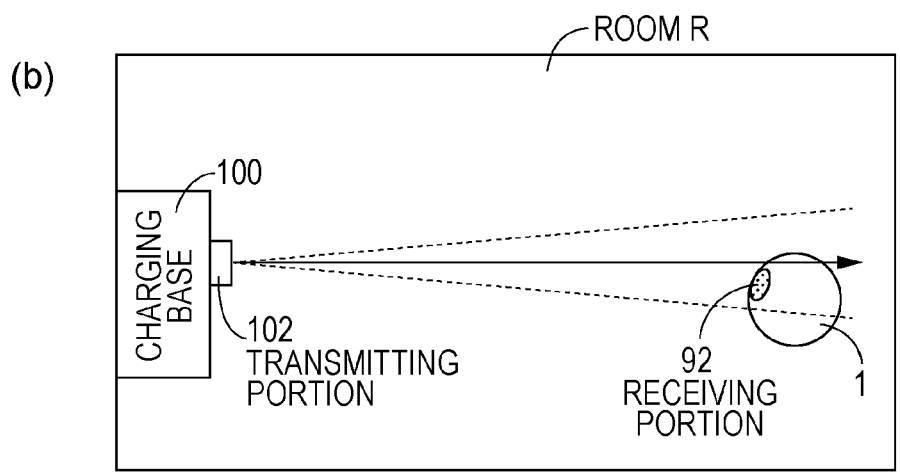
(c)
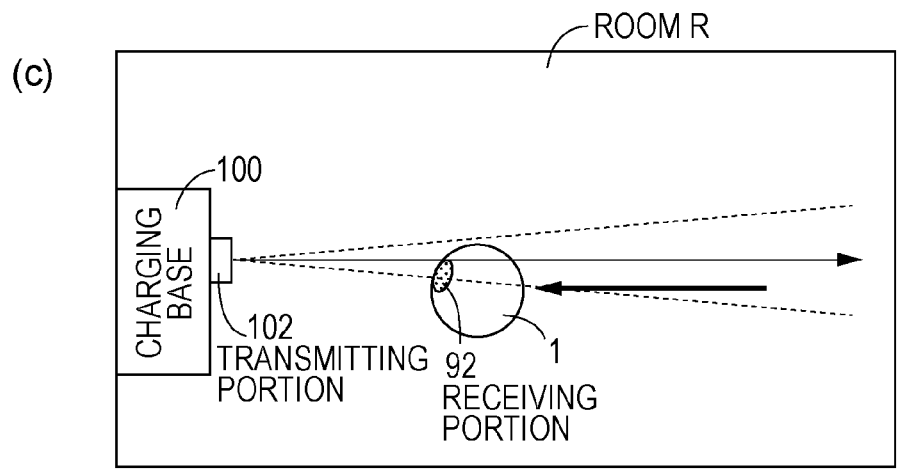

FIG. 9
(a)
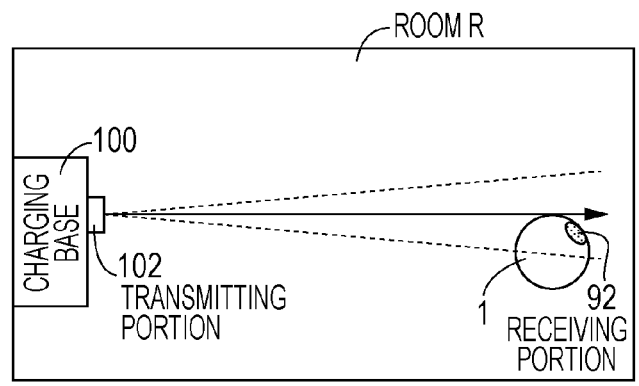
(b)
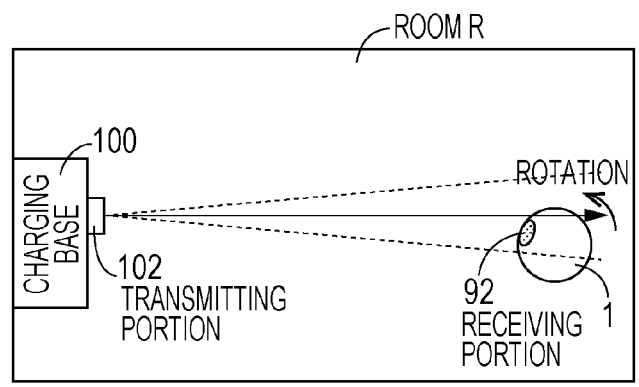
(c)
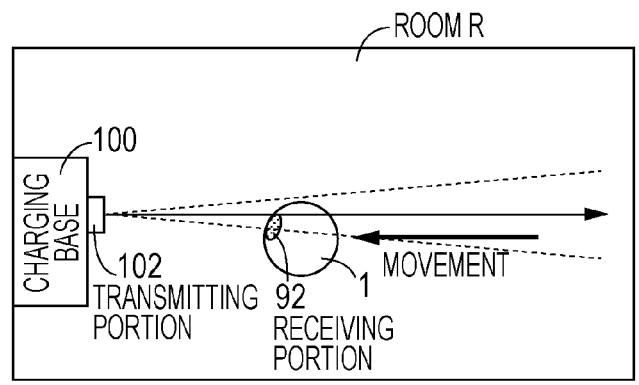
(d)
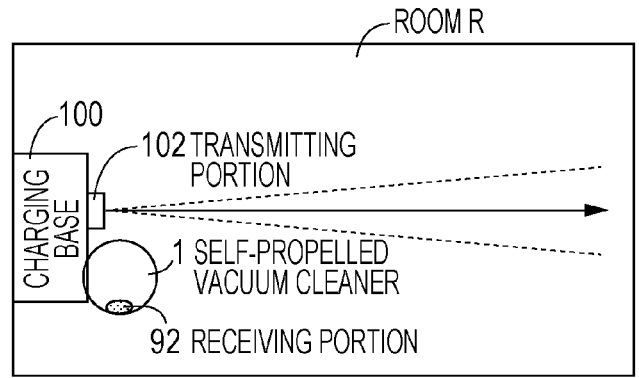

SELF-PROPELLED ELECTRONIC DEVICE

TECHNICAL FIELD

The present invention relates to self-propelled electronic devices and, more particularly, to a self-propelled electronic device that automatically returns to a charging base.

BACKGROUND ART

In general, a vacuum cleaner for removing dust on a floor surface or the like is configured to suck air therein and capture and collect the dust in the sucked air.

As the dust collection method thereof, a method of providing a detachable bag that also functions as a filter and, when the bag has been filled with the dust, replacing the bag with a new bag has become mainstream.

Moreover, in addition to this, a cyclone portable vacuum cleaner, a rechargeable portable vacuum cleaner, a self-propelled vacuum cleaner called a robotic cleaner, and so forth are used.

As an example of the self-propelled vacuum cleaner, robotic cleaners described in PTLs 1 and 2 have been proposed.

The self-propelled vacuum cleaner is provided with a rechargeable battery, and, separately from the vacuum cleaner, a charging base is fixedly placed in a predetermined position.

The self-propelled vacuum cleaner cleans a room by autonomously travelling when the remaining level of the rechargeable battery is more than or equal to a predetermined value.

Moreover, there is a self-propelled vacuum cleaner that searches for the position of the charging base, while autonomously travelling, when the remaining battery level becomes less than or equal to a predetermined value and, when finding the charging base, travels toward the charging base and recharges the rechargeable battery by connecting the rechargeable battery thereof to the charging base.

The search for the position of the charging base is performed by the detection of an optical beam emitted from the charging base with a light receiving element.

CITATION LIST

Patent Literature

PTL 1: Japanese Unexamined Patent Application Publication No. 2004-195215
PTL 2: Japanese Unexamined Patent Application Publication No. 2007-167617

SUMMARY OF INVENTION

Technical Problem

However, it often takes time for an existing self-propelled vacuum cleaner to detect the charging base if the charging base is not located in a front direction in which the light receiving element is attached or due to an obstacle located between the charging base and the self-propelled vacuum cleaner. Moreover, even when the self-propelled vacuum cleaner is located near the charging base, the self-propelled vacuum cleaner sometimes cannot find the charging base and travels in order to search for the charging base only to move away from the charging base.

Thus, this invention has been made in view of the circumstances described above, and an object thereof is to provide a self-propelled electronic device including a self-propelled vacuum cleaner that can shorten the time required for the self-propelled electronic device to return to a charging base, when the self-propelled electronic device needs charging, by detecting the charging base as quickly as possible.

The present invention can be implemented not only as the self-propelled vacuum cleaner but also as a self-propelled air cleaner that sucks air therein and cleans the air and an ion generator that performs ion generation in the same manner. Therefore, the present invention includes control and apparatus by and in which a self-propelled electronic device that autonomously travels to a position desired or an arbitrary position returns to a charging base.

Solution to Problem

This invention provides a self-propelled electronic device that is supplied with power from a charging base installed in a predetermined position in a state in which the self-propelled electronic device is in contact with the charging base and travels to a position away from the charging base, the self-propelled electronic device including: a travelling control unit that makes the self-propelled electronic device move automatically by controlling the rotation of a wheel; a rechargeable battery that supplies power for performing travelling control during the automatic travelling; a charging base searching unit that searches for the position of the charging base; and a control unit; wherein, when the control unit determines that returning to the charging base is required, the control unit performs return processing by which the self-propelled electronic device is made to come to rest and then rotate in a resting state by the travelling control unit and, when the charging base searching unit searches for the direction in which the charging base lies and detects the direction in which the charging base lies at the time of the rotation, the self-propelled electronic device moves in the direction in which the charging base lies.

According to this, when the self-propelled electronic device of this invention determines that there is a need to return to a state in which the self-propelled electronic device is in contact with the charging base, since the self-propelled electronic device comes to rest and then rotates and, at the time of rotation, detects the direction in which the charging base lies, the self-propelled electronic device can quickly detect the direction in which the charging base lies.

Furthermore, since the self-propelled electronic device moves in the detected direction in which the charging base is located, it is possible to shorten the time the self-propelled electronic device takes to return to the charging base.

Moreover, a remaining battery level detecting unit that detects a remaining battery level of the rechargeable battery and a storage unit that stores in advance battery information which is compared with the detected remaining battery level are further included, and, when the detected remaining battery level becomes less than or equal to a first remaining level threshold value P1 stored as the battery information, the control unit determines that returning to the charging base is required and performs the return processing.

According to this, since it is determined that returning to the charging base is required when the remaining battery level of the rechargeable battery gets low, it is possible to perform the return processing in a state in which a sufficient amount of power needed for the self-propelled electronic device to return to the charging base is left and prevent a situation in which the self-propelled electronic device uses up the power during the return processing and becomes unable to return to the position of the charging base.

Furthermore, when the remaining battery level detected by the remaining battery level detecting unit becomes less than or equal to a second remaining level threshold value P2 smaller than the first remaining level threshold value P1 while the self-propelled electronic device is automatically travelling, the control unit stops the travelling control and makes the self-propelled electronic device come to rest in a current position.

According to this, since the electronic device automatically stops cleaning and travelling when the remaining battery level of the rechargeable battery gets further low, it is possible to inform the user of the necessity for charging by using the remaining power.

In addition, an input portion with a charging request switch to be used by a user to input a charging request is further included, and, when the charging request switch is depressed during the automatic travelling, the control unit determines that returning to the charging base is required and performs the return processing.

According to this, even when the electronic device is automatically travelling, if the user determines that charging is required, it is possible to make the electronic device automatically return toward the charging base.

Moreover, a receiving portion that receives a signal transmitted from the charging base is further included, and, when the transmitted signal is detected (received) by the receiving portion, the charging base searching unit recognizes that the charging base lies in a front direction of the receiving portion.

According to this, since the direction in which the charging base lies is recognized by detection (reception) of the signal transmitted from the charging base, it is possible to identify reliably the direction in which the charging base lies.

Furthermore, the input portion includes a starting switch for performing operation start and stop input, and, when the starting switch is input during operation, the control unit stops the travelling control.

According to this, even during operation, the user can stop the automatic travelling at any time.

Moreover, the self-propelled electronic device can be used as a vacuum cleaner with a cleaning function or an ion generating device with an ion generating function.

Advantageous Effects of Invention

According to this invention, if it is determined that there is a need for a self-propelled electronic device to return to a state in which the self-propelled electronic device is in contact with a charging base while automatic travelling is performed, since the self-propelled electronic device rotates in a resting state and detects the direction in which the charging base lies during the rotation, as compared to a case in which the position of the charging base is detected by simply continuing the automatic travelling, it is possible to detect the direction in which the charging base lies more quickly.

Moreover, since, after detecting the direction in which the charging base lies, the self-propelled electronic device moves in the detected direction in which the charging base lies, the self-propelled electronic device can approximately linearly return to the charging base, which makes it possible to shorten the time the self-propelled electronic device takes to return to the charging base.

BRIEF DESCRIPTION OF DRAWINGS

FIG. 8 is an explanatory diagram of an example of return operation of the self-propelled vacuum cleaner of this invention.

FIG. 9 is an explanatory diagram of an example of return operation of the self-propelled vacuum cleaner of this invention.

DESCRIPTION OF EMBODIMENTS

Hereinafter, an embodiment of the present invention will be described with reference to the drawings. Incidentally, the following description of an example does not limit this invention.

In the present invention, a description will be given by taking a "self-propelled vacuum cleaner" as an example. The self-propelled vacuum cleaner means a vacuum cleaner that is provided with a housing having an inlet port in a bottom face and a dust collector inside, a drive wheel that makes the housing travel, a control unit that controls the rotation, the halting, the direction of rotation, and the like of the drive wheel, and so forth and autonomously performs cleaning operation away from the hands of the user, and an example thereof is described by an embodiment using the drawings which will be described later. Moreover, the present invention includes not only the self-propelled vacuum cleaner, but also a self-propelled air cleaner that sucks air therein and discharges the cleaned air, a self-propelled ion generator that performs ion generation, and, in addition thereto, a self-propelled robot, for example, that can present needed information and the like to the user and meet the needs of the user. In a word, the present invention relates to an apparatus as a whole that includes an apparatus main body provided with a storage unit battery (a rechargeable battery) and can return to a charging base by autonomously travelling when charging is needed.

<Configuration of the Self-Propelled Vacuum Cleaner>

Figure 1:
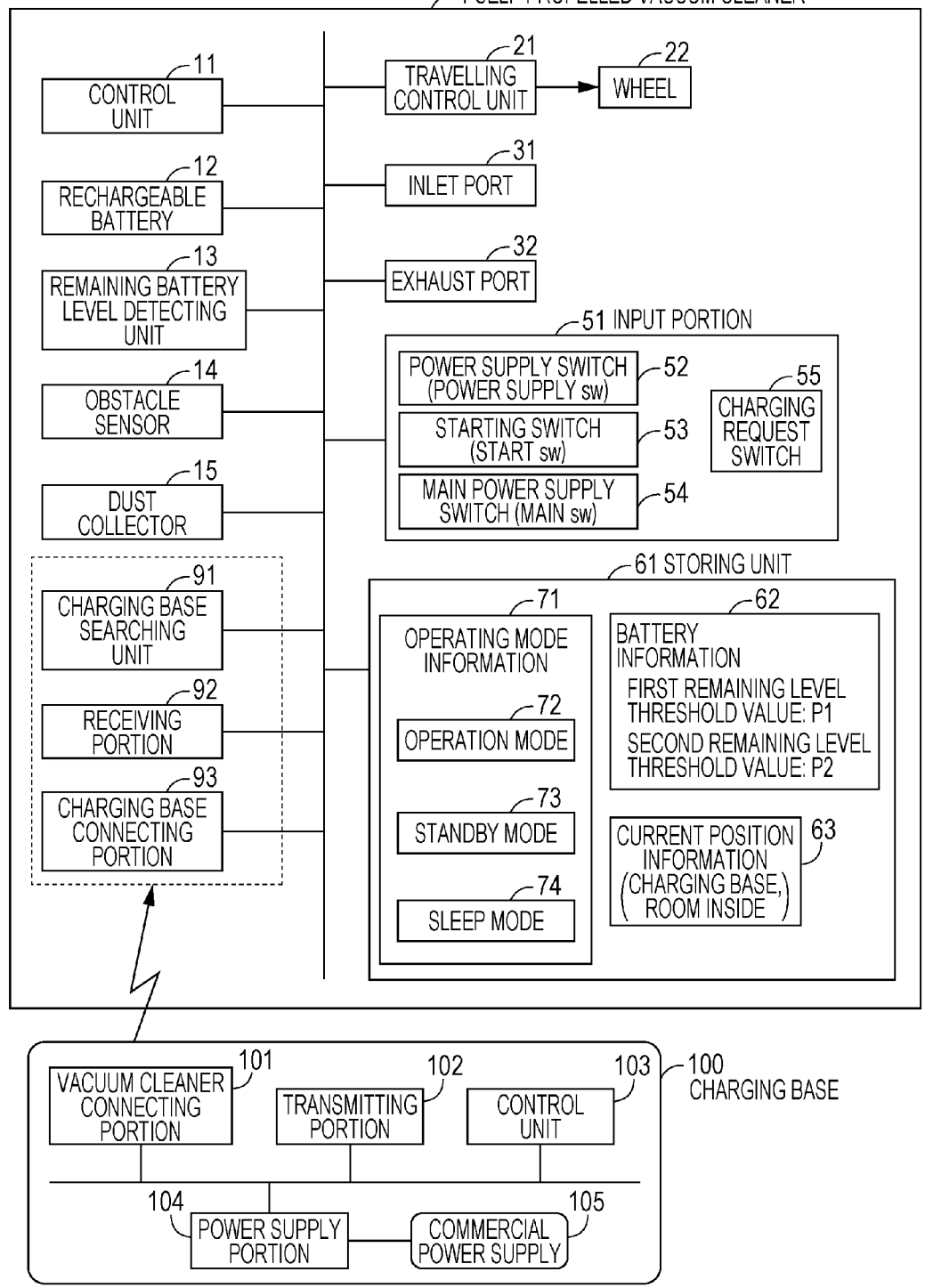
FIG. 1 is a schematic configuration block diagram of an example of a self-propelled vacuum cleaner of this invention.

In FIG. 1, a schematic configuration block diagram of an example of the self-propelled vacuum cleaner of this invention is depicted.

In FIG. 1, the self-propelled vacuum cleaner (hereinafter also referred to as a vacuum cleaner or a cleaner) of this invention mainly includes a control unit 11, a rechargeable battery 12, a remaining battery level detecting unit 13, an obstacle sensor 14, a dust collector 15, a travelling control unit 21, a wheel 22, an inlet port 31, an exhaust port 32, an input portion 51, a storage unit 61, a charging base searching unit 91, a receiving portion 92, and a charging base connecting portion 93.

Moreover, a charging base 100 is fixedly installed in a predetermined position in a room to be cleaned. As a result of connecting the vacuum cleaner 1 with the charging base 100, the vacuum cleaner 1 charges the rechargeable battery 12 of the vacuum cleaner 1 by receiving the supply of power from the charging base in a state in which the vacuum cleaner 1 is in contact with the charging base. Furthermore, the vacuum cleaner 1 leaves the charging base and executes a cleaning function while automatically travelling.

The self-propelled vacuum cleaner 1 of this invention is a cleaning robot that cleans a floor surface by sucking air therein, the air containing dust on the floor surface, while autonomously travelling on the floor surface of a place in which the self-propelled vacuum cleaner 1 is installed and discharging the air from which the dust is removed. The vacuum cleaner 1 of this invention has the function of autonomously returning to the charging base 100 when the cleaning is finished.

Figure 10:
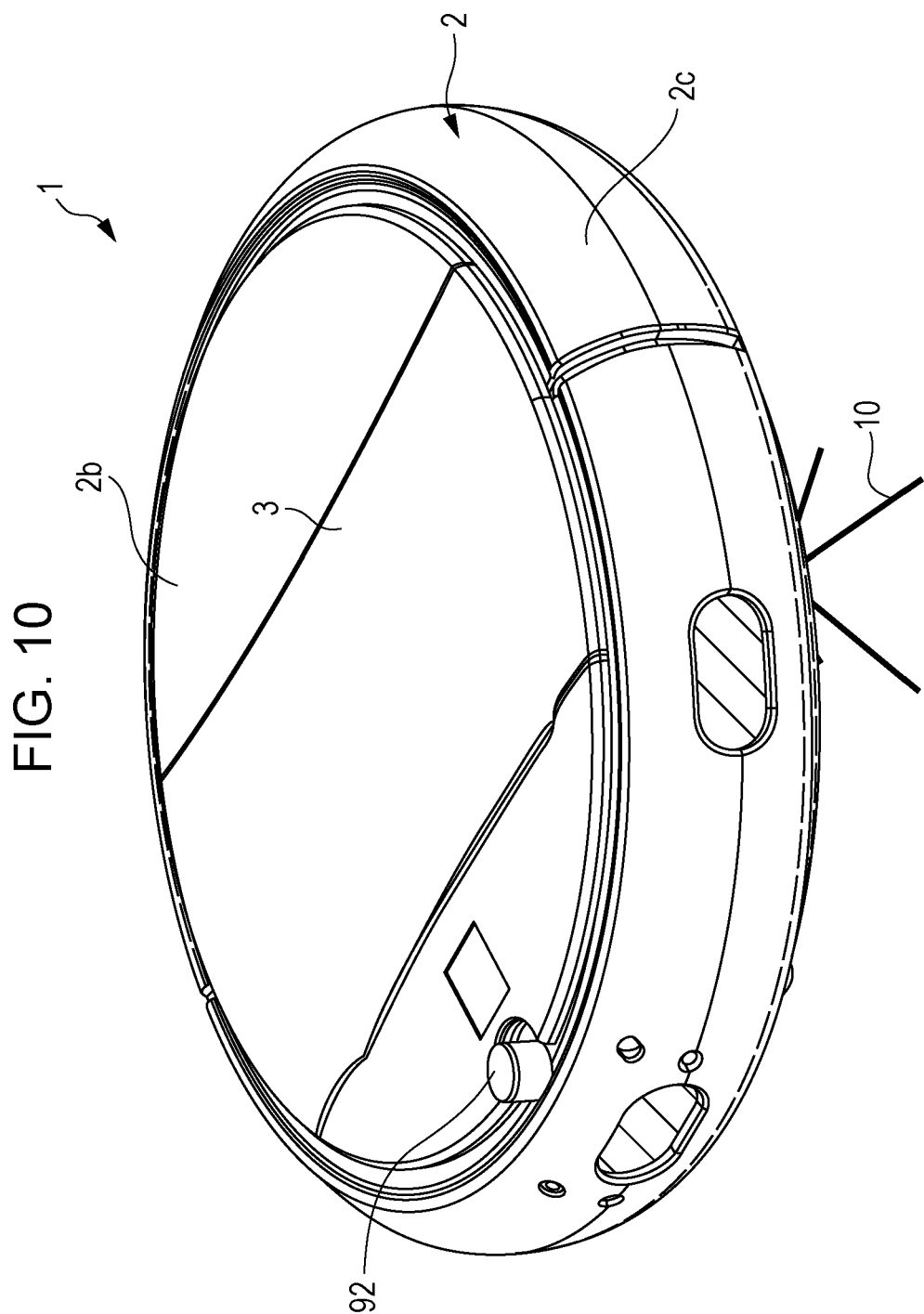
FIG. 10 is a schematic perspective view of an example of the self-propelled vacuum cleaner of this invention.

In FIG. 10, a schematic perspective view of an example of the self-propelled vacuum cleaner of this invention is depicted.

In FIG. 10, a cleaning robot 1 which is the self-propelled vacuum cleaner of the present invention includes a disk-shaped housing 2, and, inside and outside the housing 2, a rotatable brush, a side brush 10, the dust collector, an electric blower, the wheel 22 formed of a plurality of drive wheels, a rear wheel, and a front wheel, the receiving portion 92, and the other component elements depicted in FIG. 1 are provided.

In FIG. 10, a part in which the receiving portion 92 and the front wheel are disposed is referred to as a front part, a part in which the rear wheel is disposed is referred to as a rear part, and a part in which the dust collector 15 is disposed is referred to as an intermediate part.

The housing 2 includes a bottom plate which is circular in a plan view and has the inlet port 31, a top plate 2b having, in a central portion thereof, a lid portion 3 that opens and closes when the dust collector 15 which is housed in the housing 2 is taken in and out, and a side plate 2c which is annular in a plan view and is provided along the periphery of the bottom plate and the top plate 2b. Moreover, in the bottom plate, a plurality of hole portions thorough which the lower parts of the front wheel, the pair of drive wheels, and the rear wheel are made to protrude from the inside of the housing 2 to the outside are formed, and an exhaust port 32 is formed near the boundary between the front part and the intermediate part in the top plate 2b. Incidentally, the side plate 2c is divided into two portions: a front portion and a rear portion, and the front portion of the side plate functions as a bumper.

Furthermore, the vacuum cleaner 1 moves forward as a result of the pair of drive wheels rotating forward in the same direction, moves backward as a result of the pair of drive wheels rotating backward in the same direction, and revolves in a resting state as a result of the pair of drive wheels rotating in opposite directions. For example, when the cleaning robot 1 reaches the edge of a cleaning region or hits an obstacle on the path on which the cleaning robot 1 is travelling, the drive wheels stop, and the cleaning robot 1 veers off in a different direction by rotating the pair of drive wheels in opposite directions. As a result, the vacuum cleaner 1 autonomously travels all over the place in which the vacuum cleaner 1 is installed or all over a desired range while avoiding the obstacles.

Moreover, as will be described later, the vacuum cleaner 1 recognizes a direction in which the charging base 100 lies by detecting a signal that is sent out from a transmitting portion 102 of the charging base 100 with the receiving portion 92, and, for example, when cleaning is finished, when the remaining charging level of the rechargeable battery 12 gets low, or when the set time of a cleaning timer has elapsed, the vacuum cleaner 1 automatically travels approximately linearly in the direction in which the charging base lies and returns to the charging base 100.

Furthermore, as will be described later, in this invention, the feature is that, if the vacuum cleaner 1 cannot detect a signal from the charging base 100 when trying to return thereto, the vacuum cleaner 1 temporarily comes to rest and rotates (rotates 360 degrees) there, and detects a direction in which the charging base lies by checking whether or not a signal from the charging base 100 is detected.

If the signal is detected, the vacuum cleaner 1 recognizes that the charging base 100 lies anterior to the receiving portion of the vacuum cleaner at the time of detection of the signal and travels linearly toward the charging base. However, if there is an obstacle, the vacuum cleaner 1 moves toward the charging base while avoiding the obstacle.

Hereinafter, each of the component elements depicted in FIG. 1 will be described.

The control unit 11 of FIG. 1 is a portion that controls the operation of the component elements of the vacuum cleaner 1 and is implemented mainly by a microcomputer formed of a CPU, ROM, RAM, an I/O controller, a timer, and so forth.

The CPU makes each hardware operate organically based on a control program stored in advance in the ROM or the like and thereby executes the cleaning function, the travelling function, and so forth of this invention.

The rechargeable battery 12 is a portion that supplies power to each functional element of the vacuum cleaner 1 and is a portion that mainly supplies power for performing the cleaning function and the travelling control. For example, a rechargeable battery such as a lithium-ion battery, a nickel metal hydride battery, or an Ni—Cd battery is used.

Recharging of the rechargeable battery 12 is performed in a state in which the vacuum cleaner 1 and the charging base 100 are connected to each other.

The connection of the vacuum cleaner 1 and the charging base 100 is performed by bringing exposed charging terminals which are connecting portions (93, 101) thereof into contact with each other.

The remaining battery level detecting unit 13 is a portion that detects the remaining capacity (the remaining battery level) of the rechargeable battery and outputs a numeric value that expresses the current remaining capacity relative to the fully charged state as a percent.

As will be described later, based on the remaining battery level (%) detected here, the vacuum cleaner 1 determines whether the vacuum cleaner 1 returns to the charging base 100 or shifts to a sleep mode in which the vacuum cleaner 1 comes to rest there and ends the operation.

The obstacle sensor 14 is a portion that senses that the vacuum cleaner 1 has come into contact with or becomes close to an obstacle such as a desk or a chair in a room while travelling, for example, a contact sensor or an obstacle sensor formed of a microswitch, an ultrasonic sensor, an infrared range sensor, or the like is used, and the obstacle sensor 14 is disposed in the front portion of the side plate 2C of the housing 2.

The CPU recognizes the position in which the obstacle lies based on the signal output from the obstacle sensor 14. Based on the position information of the recognized obstacle, the CPU determines a direction in which the vacuum cleaner 1 should travel next time while avoiding the obstacle.

The dust collector 15 is a portion that executes the cleaning function of collecting dirt and dust in the room and mainly includes an unillustrated dust collection container, a filter portion, and a cover portion that covers the dust collection container and the filter portion.

Moreover, the dust collector 15 has an inflow path communicating with the inlet port 31 and an exhaust path communicating with the exhaust port 32, and guides the air sucked through the inlet port 31 to the inside of the dust collection container via the inflow path and discharges the air subjected to dust collection to the outside through the exhaust port 32 via the exhaust path.

The travelling control unit 21 is a portion that controls the autonomous travelling of the vacuum cleaner 1 and is a portion that mainly moves the vacuum cleaner 1 automatically by controlling the rotation of the wheel 22 described above.

By driving the wheel, the travelling control unit 21 makes the vacuum cleaner 1 perform operations such as moving forward, moving backward, rotating, and coming to rest.

The inlet port 31 and the exhaust port 32 are a portion that sucks air and a portion that discharges air, respectively, for cleaning and are formed in the positions described above.

The input portion 51 is a portion that is used by the user to input an instruction related to the operation of the vacuum cleaner 1 and is provided as an operation panel or an operation button on the surface of the housing of the vacuum cleaner 1.

Alternatively, as the input portion 51, by providing a remote control unit separately from a vacuum cleaner main body and sending out infrared radiation or a radio wave signal by pressing an operation button provided in the remote control unit, an instruction related to the operation may be input by radio communication.

As the input portion 51, for example, a power supply switch (a power supply sw) 52, a starting switch (a start sw) 53, a main power supply switch (a main sw) 54, a charging request switch 55, other switches (an operation mode switch, a timer switch), and so forth are provided. Incidentally, as the input portion 51, the user receives an instruction given by remote control. Based on this instruction content, it is sent to the travelling control unit 21 via the control unit 11, whereby travelling control in the direction indicated by the user, control to stop travelling, control of ion generation amount, and so forth are executed.

Figure 2:
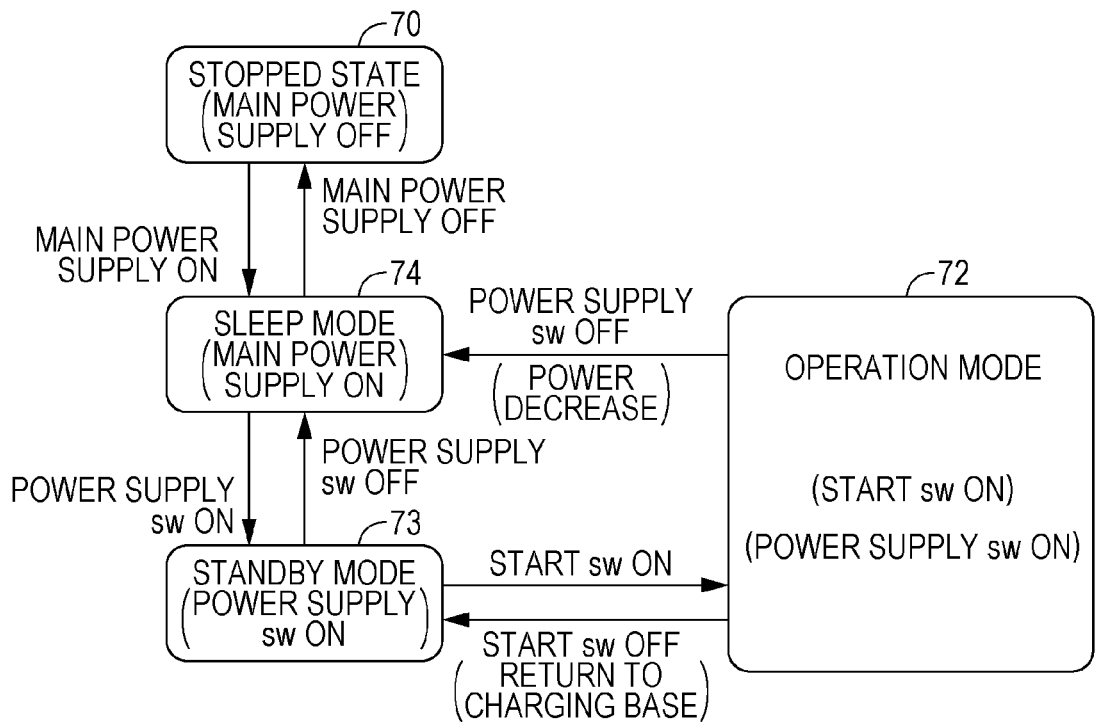
FIG. 2 is a state transition diagram of an operating mode of the self-propelled vacuum cleaner of this invention.

In FIG. 2, a schematic explanatory diagram of a state transition of an operating mode of this invention is depicted.

Here, as an example, four modes and states, a stopped state 70, a sleep mode 74, a standby mode 73, and an operation mode 72, are depicted.

However, the operating mode is not limited to these modes and states.

The main power supply switch (the main sw) 54 is a switch for turning on (ON) or off (OFF) the supply of power to the whole of the vacuum cleaner 1 main body.

When the main sw 54 is OFF, the vacuum cleaner 1 is in a complete stopped state 70 and in a state in which the vacuum cleaner 1 does not accept all the operation inputs from the input portion 51 except for ON input of the main sw 54.

Moreover, when the main sw 54 is ON, the vacuum cleaner 1 is in a state in which the vacuum cleaner 1 accepts only an operation input performed by turning on or off the power supply sw 52 and does not accept an operation input of the other input portion 51. As described above, a state in which the main sw 54 is in an ON state and the power supply sw 52 is in an OFF state is referred to as the sleep mode 74.

Therefore, if the main power supply switch (the main sw) 54 is turned on (ON) in the stopped state 70, the mode shifts to the sleep mode.

The sleep mode 74 is a state in which at least an operation to turn on (ON) the power supply sw 52 is accepted, and, if the power supply sw 52 is turned on (ON) by the user in the sleep mode 74, the mode shifts to the standby mode 73.

The power supply switch (the power supply sw) 52 is a switch for bringing the principal functions of the vacuum cleaner 1 to an operable state, and, if the power supply switch (the power supply sw) 52 is turned on (ON), power is supplied to at least the control unit 11 from the rechargeable battery 12, and the state enters a state in which the CPU is operating (a standby state).

The standby mode 73 is a state in which the cleaning function and the travelling function can be executed if the input of an instruction or the like is performed by the user, and, for example, if the starting switch (the start sw) 53 is turned on (ON) by the user in the standby mode 73, the mode shifts to the operation mode 72.

The starting switch (the start sw) 53 is a switch for inputting the start and halting of the operation of the vacuum cleaner 1 and, specifically, is a switch for causing the cleaning function and the travelling function to be executed.

If the start sw 53 is turned on (ON) in the standby mode 73, for example, autonomous travelling is started by the travelling control unit 21 of the vacuum cleaner 1 and cleaning is then started by the dust collector 15.

Moreover, if the start sw 53 is input during the execution of the cleaning function, it means that a turning-off (OFF) input operation has been performed, and the control unit 11 stops the cleaning function and the travelling control.

The operation mode 72 is a mode that mainly executes the cleaning function and the travelling function, and, as will be described later, the vacuum cleaner 1 continues cleaning while traveling in the room as long as the remaining battery level of the rechargeable battery 12 is more than or equal to a predetermined value and, when the remaining battery level of the rechargeable battery gets low, the vacuum cleaner 1 recognizes the direction in which the charging base is located by receiving the light from the charging base and automatically returns to the charging base.

The charging request switch 55 is a switch used by the user to input a charging request.

For example, while the vacuum cleaner 1 is autonomously travelling, if the user notices that the traveling operation has got slow and presses the charging request switch 55 to perform charging, the vacuum cleaner 1 temporarily suspends cleaning and performs processing (return processing) to return toward the charging base.

The storage unit 61 is a portion that stores information needed to implement the various functions of the vacuum cleaner 1 and a program, and semiconductor devices such as RAM and ROM, a hard disk, and storage media such as a flash memory are used.

In the storage unit 61, battery information 62, current position information 63, operating mode information 71, and so forth are mainly stored.

The battery information 62 includes a remaining battery level (%) detected by the remaining battery level detecting unit 13, a judgment value (a first remaining level threshold value P1 and a second remaining level threshold value P2 which will be described later) which is compared with the remaining battery level detected to decide to return to the charging base, and so forth.

The current position information 63 is information indicating the position in which the vacuum cleaner 1 currently lies and is, for example, relative coordinate information indicating where the vacuum cleaner 1 is in the room in which cleaning is performed.

For example, it is a coordinate value of the position in which connection to the charging base is established or a coordinate value indicating the current position of the vacuum cleaner.

Furthermore, based on this information 63, history information (travelling map) of actual travelling may be generated. The travelling map can be used to determine a travelling route in subsequent cleaning.

In this invention, the vacuum cleaner 1 itself performs processing to return to the charging base 100, and the control unit 11 performs the return processing when determining that there is a need to return to a state in which the vacuum cleaner 1 is in contact with the charging base.

Here, if the control unit 11 determines that there is a need to return, the control unit 11 performs return processing by which the vacuum cleaner 1 is made to come to rest and then rotate 360 degrees in a resting state by the travelling control unit 21, while the vacuum cleaner 1 is rotating 360 degrees, the charging base searching unit 91 searches for the direction in which the charging base lies, and, if the direction in which the charging base is located is detected, the vacuum cleaner 1 moves in the direction in which the charging base lies.

Here, a case where it is determined that there is a need to return to a state in which the vacuum cleaner 1 is in contact with the charging base includes, for example, a case where the remaining battery level of the rechargeable battery 12 gets low, a case where the user gives a return instruction by using the remote control, such as a case where the charging request switch 55 is depressed by the user, and other cases.

In particular, if the remaining battery level detected by the remaining battery level detecting unit 13 becomes less than or equal to the first remaining level threshold value P1 stored as the battery information 62, it is determined that there is a need to return to the charging base, and the return processing is performed.

Alternatively, if the charging request switch 55 is depressed during automatic travelling, it is determined that there is a need to return to the charging base, and the return processing is performed.

Moreover, if the detected remaining battery level becomes less than or equal to the second remaining level threshold value P2 which is smaller than the first remaining level threshold value P1, the control unit 11 stops the cleaning function and the travelling control and makes the vacuum cleaner 1 come to rest in the current position.

In addition to the configuration described above, the vacuum cleaner 1 of this invention may have other necessary configurations and functions.

For example, a configuration (an ion generator) that generates ions during cleaning or in a resting state may be included for sterile filtration and deodorization (or elimination of odors).

Moreover, a timer switch that sets the time in which cleaning processing is performed may be provided such that, if an operation to turn on (ON) the timer switch is performed, the count of the preset time (for example, 60 minutes) is started and the cleaning processing is performed until the set time elapses.

After the set time has elapsed, the cleaning processing may be stopped and the vacuum cleaner 1 may automatically return to the charging base.

In FIG. 1, the charging base searching unit 91, the receiving portion 92, and the charging base connecting portion 93 are configurations to detect the position of the charging base 100 and receive power from the charging base.

The charging base searching unit 91 is a portion that searches for the position of the charging base and is a portion that detects in which direction the position in which the charging base 100 lies is located when the vacuum cleaner is in a position away from the charging base.

In the search for the charging base, autonomous travelling processing by the travelling control unit 21 and signal detection processing by the receiving portion 92 are used.

When a signal from the charging base 100 is detected by the receiving portion 92, the charging base searching unit 91 recognizes that the charging base lies anterior to the receiving portion 92.

Moreover, if the charging base 100 is not detected in the current position of the vacuum cleaner, as described above, the vacuum cleaner rotates in a state in which the vacuum cleaner remains at rest in the current position thereof and checks whether or not a signal transmitted from the charging base 100 is detected by the receiving portion 92.

The receiving portion 92 is a portion that receives (detects) a light, electric waves, ultrasonic waves, and other wireless signals which are transmitted from the transmitting portion 102 of the charging base 100. As an element of the receiving portion, a common element that can receive the transmitted light, electric waves, ultrasonic waves, and other wireless signals can be used.

As the signal that is transmitted from the charging base 100, for example, visible radiation which is a light, infrared radiation, or electric waves and ultrasonic waves, and so forth are used. In this case, since a directional property or the like is required, as the signal that is transmitted from the transmitting portion, a signal having directivity and some width, such as a laser light, a beacon, or the like, is suitable. In general, a beacon or the like is commonly used. Incidentally, it is also possible to use a light by providing the light with directivity.

The charging base connecting portion 93 is a terminal for inputting power for charging the rechargeable battery 12.

By bringing the charging base connecting portion 93 and the vacuum cleaner connecting portion 101 of the charging base 100 into physical contact with each other, the rechargeable battery 12 is supplied with the power provided from a power supply portion 104 of the charging base 100 and is charged.

The charging base connecting portion 93 is formed in a state in which the charging base connecting portion 93 is exposed on the side of the vacuum cleaner 1 main body in order to bring the charging base connecting portion 93 into contact with the vacuum cleaner connecting portion 101.

<Configuration of the Charging Base>

In FIG. 1, the charging base 100 mainly includes the vacuum cleaner connecting portion 101, the transmitting portion 102, a control unit 103, and the power supply portion 104 and is supplied with AC power-supply power from a wall outlet for a commercial power supply 105 which is placed in an indoor wall or the like.

The power supply portion 104 is a portion that accepts alternating-current power from the commercial power supply 105, converts the alternating-current power into direct-current power with which the vacuum cleaner 1 can be charged, and provides the direct-current power to the vacuum cleaner connecting portion 101.

The transmitting portion 102 is a portion that transmits (sends out) a wireless signal. For example, it is provided with directivity also for recognizing the direction, and, for example, an LED, a laser light-emitting element, or the like is used. In general, a beacon or the like is used.

For example, when infrared radiation is used as a transmitting signal, the infrared radiation is provided with directivity by which the infrared radiation travels while spreading over some range, and, when the vacuum cleaner 1 enters the range, the vacuum cleaner 1 can detect the infrared radiation by the receiving portion 92.

Moreover, even when the vacuum cleaner 1 lies in the above-described range, if the receiving portion 92 of the vacuum cleaner 1 faces in a direction opposite to the charging base 100, the receiving portion 92 cannot receive the infrared radiation, for example. However, as a result of the vacuum cleaner 1 rotating 360 degrees in a resting position as described above, it becomes possible to receive the infrared radiation. This point will be described in detail later.

The control unit 103 of the charging base 100 is a portion that implements the various functions of the charging base and mainly performs light emitting processing and charging power supply control. The control unit 103 can be implemented by a microcomputer formed of a CPU, ROM, RAM, an I/O controller, a timer, and so forth.

<General Description of Return Operation>

Here, an example of return operation that is performed by the self-propelled vacuum cleaner to return to the charging base will be described.

Figure 7:
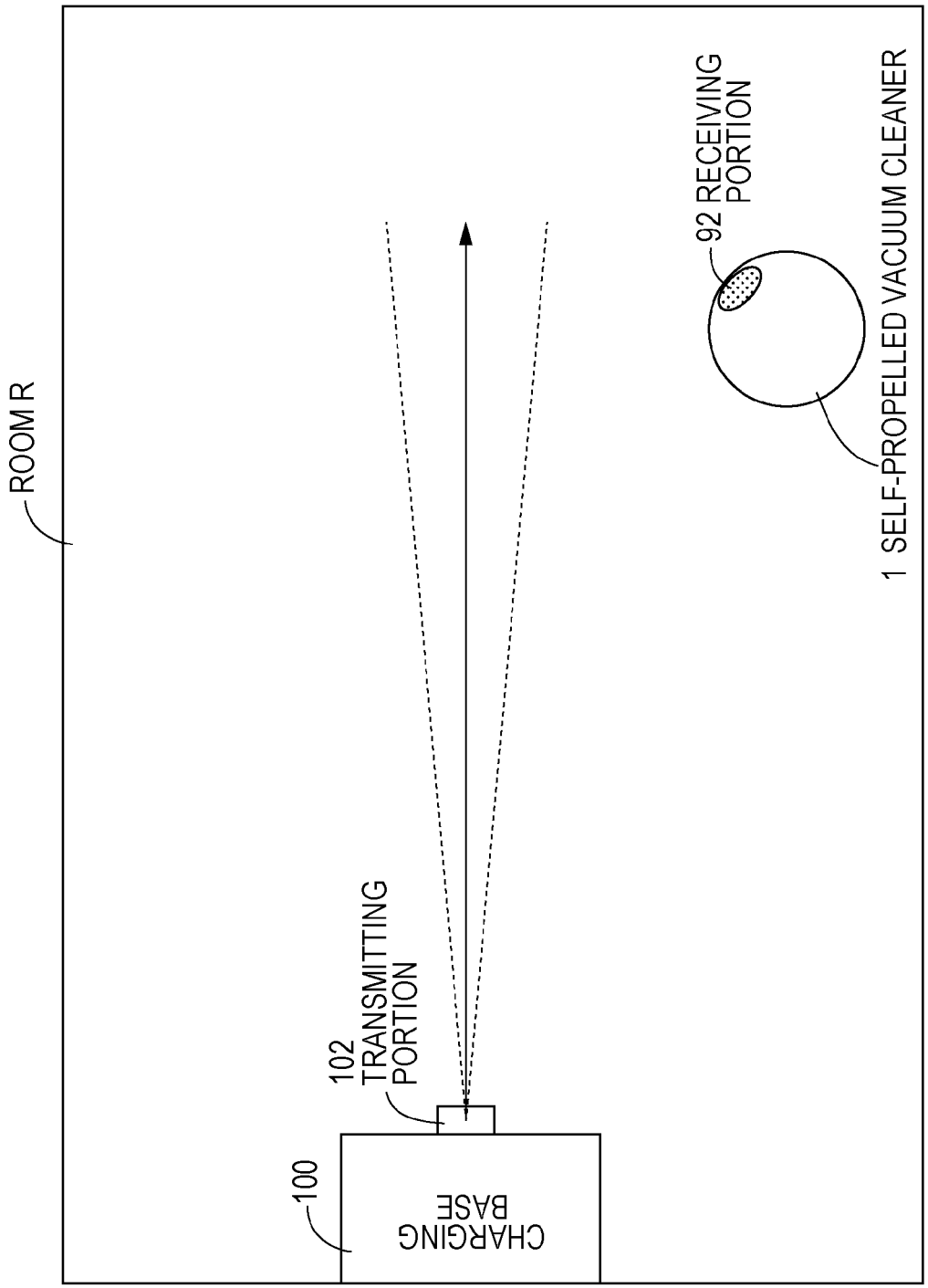
FIG. 7 is an explanatory diagram of the position of the vacuum cleaner of an example during automatic travelling of the self-propelled vacuum cleaner of this invention.

FIG. 7 depicts a state in which the vacuum cleaner 1 is travelling autonomously and cleaning the inside of a room R.

In FIG. 7, it is assumed that the charging base 100 is installed along roughly the central portion of a left wall surface of the room R.

Moreover, it is assumed that infrared radiation is emitted from the transmitting portion 102 of the charging base 100 toward a right wall of the room R.

It is assumed that the infrared radiation has directivity, travels while spreading to some extent, and is detected by the receiving portion 92 at a sufficient intensity if the receiving portion 92 of the vacuum cleaner 1 faces in the direction in which the charging base is located when the vacuum cleaner 1 enters a range (which will be referred to as a detectable region) lying between two dotted lines of FIG. 7. Incidentally, in the following description, a case where infrared radiation having directivity is used in the transmitting portion 102 and it is received (light reception is performed) in the receiving portion 92 will be described.

In the state depicted in FIG. 7, since the vacuum cleaner 1 is located outside the range indicated by the dotted lines, that is, outside the detectable region, the vacuum cleaner 1 cannot receive the infrared radiation.

FIG. 8 depicts an explanatory diagram of an example of operation that is performed by the vacuum cleaner to return to the charging base.

FIG. 8(a) depicts a state in which charging is being performed and a state in which the vacuum cleaner 1 is in the position of the charging base 100 and is in contact therewith by the connecting portions (93, 101).

If the starting switch (the start sw) 53 is input (ON) in this state, the vacuum cleaner 1 leaves the charging base and starts cleaning and moves within the room R while travelling autonomously.

FIG. 8(b) depicts a state of an example during cleaning.

Here, the vacuum cleaner 1 is located in the detectable region in which the infrared radiation emitted from the transmitting portion 102 of the charging base is detectable, and, since the receiving portion 92 faces in the direction in which the transmitting portion 102 is located, the receiving portion 92 is in a state in which the receiving portion 92 can detect the infrared radiation.

In FIG. 8(b), assume that it is determined that, for example, the remaining battery level of the rechargeable battery 12 becomes lower than a predetermined value (a first remaining level threshold value: P1).

In this case, the vacuum cleaner 1 stops cleaning operation and comes to rest there, and starts processing to search for the charging base 100.

The vacuum cleaner 1 rotates in that resting position and checks whether or not the infrared radiation is received from the charging base 100.

In the case of FIG. 8(b), since the infrared radiation is received immediately before rotation is started, the vacuum cleaner 1 recognizes that the charging base 100 lies in the direction in which the receiving portion 92 faces.

Then, the vacuum cleaner 1 starts to travel in the direction in which the charging base 100 lies.

FIG. 8(c) depicts a state in which the vacuum cleaner 1 is returning to the charging base 100 by travelling toward the charging base 100.

In FIG. 8(c), since the vacuum cleaner 1 is located in the detectable range and the infrared radiation has been detected by the receiving portion 92, the vacuum cleaner 1 travels, approximately linearly and leftward, toward the charging base 100.

Then, when the vacuum cleaner 1 comes close to the charging base 100, the vacuum cleaner 1 moves while adjusting the orientation thereof so that the connecting portions (93, 101) can be brought into contact with each other and thereby returns to the charging base 100 as depicted in FIG. 8(a). Incidentally, in the self-propelled vacuum cleaner 1, if it is assumed that the side where the receiving portion 92 is located is generally a front side, since it is located in a rear part on the opposite side, the receiving portion 62 faces in a direction opposite to the charging base 100. The drawing merely depicts, as a charging state, a state in which the vacuum cleaner 1 returns to the charging base 100 in a position which is get out of position by 90 degrees for convenience of description.

In FIG. 9, an explanatory diagram of another example of return operation of the vacuum cleaner is depicted.

Here, unlike FIG. 8(b), it is assumed that the receiving portion 92 of the vacuum cleaner 1 faces in a different direction.

In FIG. 9(a), it is assumed that, although the vacuum cleaner 1 is located in the infrared radiation detectable range, the vacuum cleaner 1 is in a state in which the receiving portion 92 faces rightward and therefore cannot receive the infrared radiation emitted from the transmitting portion 102.

In the state of FIG. 9(a), assume that it is detected that the remaining battery level of the rechargeable battery 12 becomes lower than a predetermined value (a first remaining level threshold value P1).

At this time, the vacuum cleaner stops cleaning operation and comes to rest there, and starts processing to search for the charging base 100.

In the state of FIG. 9(a), since the infrared radiation is not received, the vacuum cleaner 1 starts to rotate in the resting position as depicted in FIG. 9(b).

As depicted in FIG. 9(b), the vacuum cleaner 1 checks whether or not the infrared radiation is detected while rotating in a counterclockwise direction, and, assume that the infrared radiation is detected when the vacuum cleaner 1 rotates to the position of FIG. 9(b).

When the infrared radiation is detected, the vacuum cleaner 1 recognizes, in the rotational position in which the infrared radiation is detected, that the charging base 100 lies anterior to the receiving portion 92.

In FIG. 9(c), as in FIG. 8(c), the vacuum cleaner 1 moves approximately linearly toward the charging base 100.

Then, as depicted in FIG. 9(d), when the vacuum cleaner 1 comes close to the charging base 100, the vacuum cleaner 1 adjusts the orientation thereof so that the connecting portions (93, 101) are brought into contact with each other and returns to the charging base.

As described above, when the infrared radiation emitted from the charging base is detected by the receiving portion 92, the vacuum cleaner moves approximately linearly toward the charging base.

As depicted in FIGS. 8 and 9, if there is no obstacle between the charging base 100 and the vacuum cleaner 1, the vacuum cleaner 1 can return to the charging base 100 in a short time by travelling the shortest way.

Moreover, as depicted in FIG. 9, since the vacuum cleaner 1 detects the direction in which the charging base is located by first coming to rest and then rotating in the position in which the vacuum cleaner 1 has come to rest, not simply continuing travelling, in order to search for the position of the charging base, there is a high probability that the vacuum cleaner 1 detects the charging base more quickly as compared to a case where the vacuum cleaner 1 continues travelling.

For example, in the state of FIG. 9(*a*), the vacuum cleaner 1 cannot detect the charging base 100, but, if the vacuum cleaner 1 simply moves in a front direction of the receiving portion 92 (to the upper right of the room R of FIG. 9), not coming to rest and rotating as in FIG. 9(*b*), the vacuum cleaner 1 travels for a while without detecting the charging base and moves upward and out of the infrared radiation detectable range, which further reduces the likelihood of detecting the charging base 100.

Furthermore, if the vacuum cleaner 1 continues traveling, there is a high probability that the vacuum cleaner 1 moves along the right wall and the upper wall of the room R, and it takes a lot of time to detect the charging base 100.

As a result, when the vacuum cleaner 1 searches for the charging base by simply travelling, it takes a long time for the vacuum cleaner 1 to return to the charging base as compared to a case where the vacuum cleaner 1 searches for the direction in which the charging base is located by rotating as depicted in FIG. 9(*b*).

Moreover, if the vacuum cleaner 1 is in the position depicted in FIG. 7, since the vacuum cleaner 1 is not in the infrared radiation detectable region, even when the vacuum cleaner 1 comes to rest there and rotates 360 degrees, the vacuum cleaner 1 cannot detect the infrared radiation immediately.

In this case, the vacuum cleaner 1 repeats the operation: moving in a front direction of the receiving portion 92 by a predetermined distance after rotating 360 degrees, coming to rest in that position, and detecting the infrared radiation by rotating 360 degrees.

When the vacuum cleaner 1 moves to the upper right from the state of FIG. 7 and comes to the position depicted in FIG. 9(*a*), by rotating in the position of FIG. 9(*b*) as described above, the vacuum cleaner 1 can detect the direction in which the charging base 100 is located.

On the other hand, if the vacuum cleaner 1 continues travelling from the position of FIG. 7 without rotating, even when the vacuum cleaner 1 comes to the position of FIG. 9(*b*), since the vacuum cleaner 1 moves further to the upper right, the charging base 100 is not yet detected.

Therefore, also in a case where the vacuum cleaner is in the position depicted in FIG. 7, by making the vacuum cleaner rotate 360 degrees in the resting state and detect the emitted light (infrared radiation) from the charging base, it is possible to detect the charging base relatively quickly and shorten the time the vacuum cleaner takes to return to the charging base.

As the predetermined distance described above, it is necessary simply to set a distance or the like corresponding to the width in the detectable region in which a transmitted signal can be received. For example, of the width of the detectable region, a distance corresponding to the width thereof in the central portion in a straight line between the transmitting portion 102 and an opposed wall can be adopted. It is necessary simply to set a suitable travel distance.

<Explanation of Operation of the Self-Propelled Vacuum Cleaner>

Figure 3:
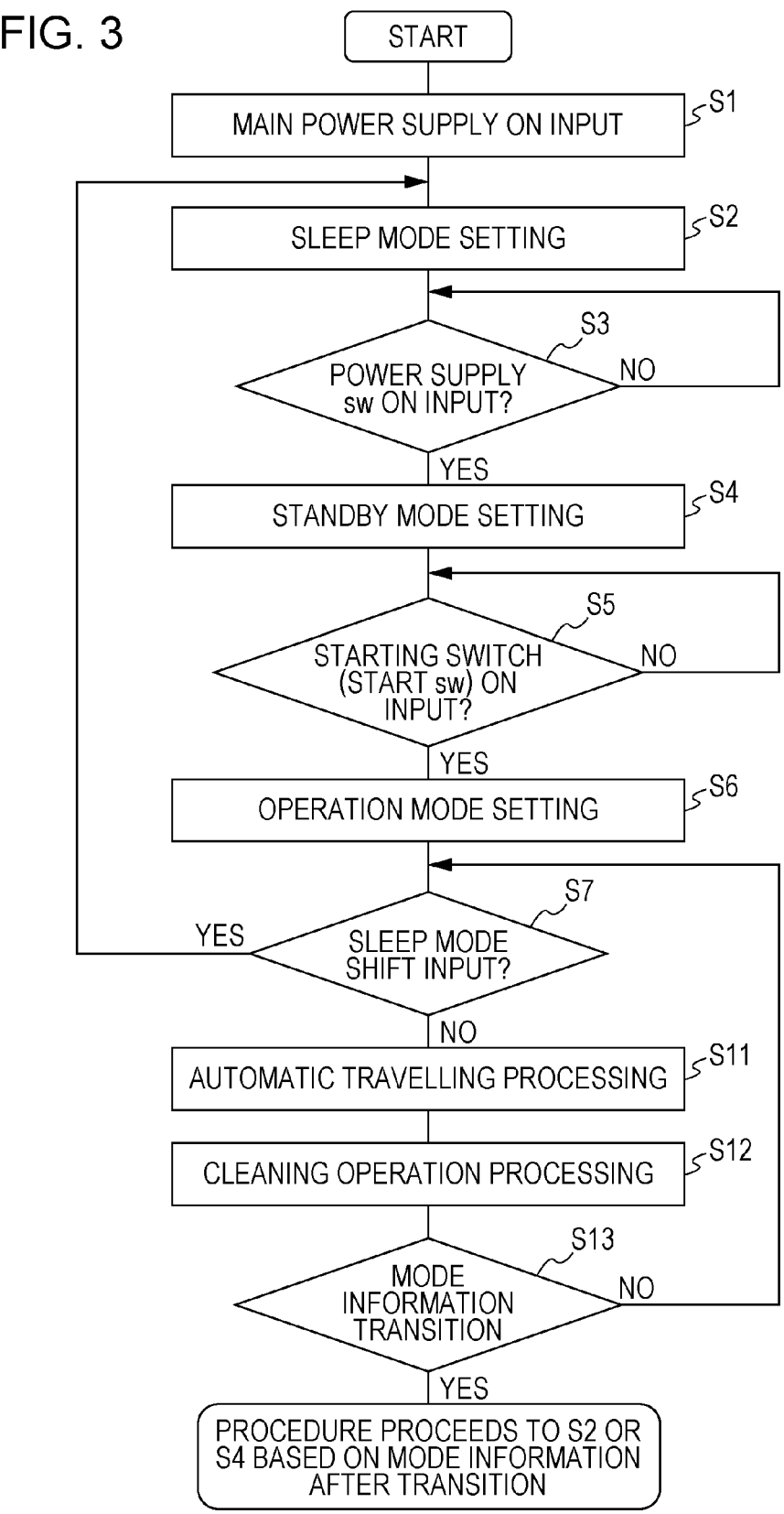
FIG. 3 is a flowchart of a general operation of the self-propelled vacuum cleaner of this invention.

In FIG. 3, a flowchart of an example of general operation of the self-propelled vacuum cleaner of this invention is described.

Here, it is assumed that the vacuum cleaner 1 is in a state (the stopped state 70) in which the main power supply switch is in an OFF state and the vacuum cleaner 1 is connected to the charging base 100.

First, in step S1, assume that the user turns on (ON) the main power supply switch (the main sw) 54 of the input portion 51.

At this time, power is supplied to the control unit 11, and the mode shifts to the sleep mode 74 as depicted in FIG. 2.

In step S2, information is set so as to correspond to the sleep mode 74. For example, the operating mode information 71 is set to the sleep mode 74, and the current position information 63 is set to the position of the charging base.

In step S3, the control unit 11 checks whether or not the power supply sw 52 is turned on (ON).

If there is an ON input, the procedure proceeds to step S4; if there is no ON input, step S3 is performed again.

In step S4, since the power supply sw is turned on (ON), as depicted in FIG. 2, the mode shifts to the standby mode 73, and the standby mode setting is made.

For example, the operating mode information 71 is set to the standby mode 73, and it is checked whether or not the starting switch (the start sw) 53 is turned on (ON).

In step S5, if it is detected that the start sw 53 is turned on (ON), the procedure proceeds to step S6; if it is not detected that the start sw 53 is turned on (ON), step S5 is performed again.

In step S6, since ON input of the start sw 53 is performed, as depicted in FIG. 2, the mode shifts to the operation mode 72 and operation mode setting is made.

Here, in addition to the setting of the operating mode information 71, the startup of the hardware necessary for the cleaning processing and processing to start the hardware necessary for autonomous travelling are performed.

In step S7, it is checked whether or not an input for shifting to the sleep mode is performed by the user.

Specifically, as depicted in FIG. 2, it is checked whether or not an off (OFF) input of the power supply sw 52 is performed.

If there is an off (OFF) input, the procedure goes back to step S2 and the mode shifts to the sleep mode 74.

On the other hand, if there is no off (OFF) input, the procedure proceeds to step S11.

In step S11, automatic travelling processing is started.

That is, the vacuum cleaner 1 drives the wheel 22 by the travelling control unit 21, leaves the charging base 100, and starts to travel based on a predetermined route.

If the history information on the past travelling route is stored in the storage unit 61, the travelling route may be determined in accordance with the history information.

In step S12, the control unit 11 starts cleaning operation processing.

Here, mainly, the dust collector 15 is started, cleaning control is performed, and travelling control is further performed.

The details of the cleaning operation processing will be described by using FIGS. 4, 5, and 6 which will be described later.

In step S13, after the cleaning operation processing is performed, it is checked whether or not a transition has taken place in the operating mode information 71. Specifically, it is checked whether the operating mode information 71 has changed from the current operation mode 72 during cleaning to the standby mode 73 or the sleep mode 74.

If the operating mode has changed, the procedure proceeds to step S2 or S4 based on the contents of the operating mode information 71 after transition.

That is, if the operating mode information 71 has changed to the sleep mode 74, the procedure proceeds to step S2; if the operating mode information 71 has changed to the standby mode 73, the procedure proceeds to step S4.

On the other hand, if the operating mode information 71 remains in the operation mode 72, the procedure goes back to step S7.

Figure 4:
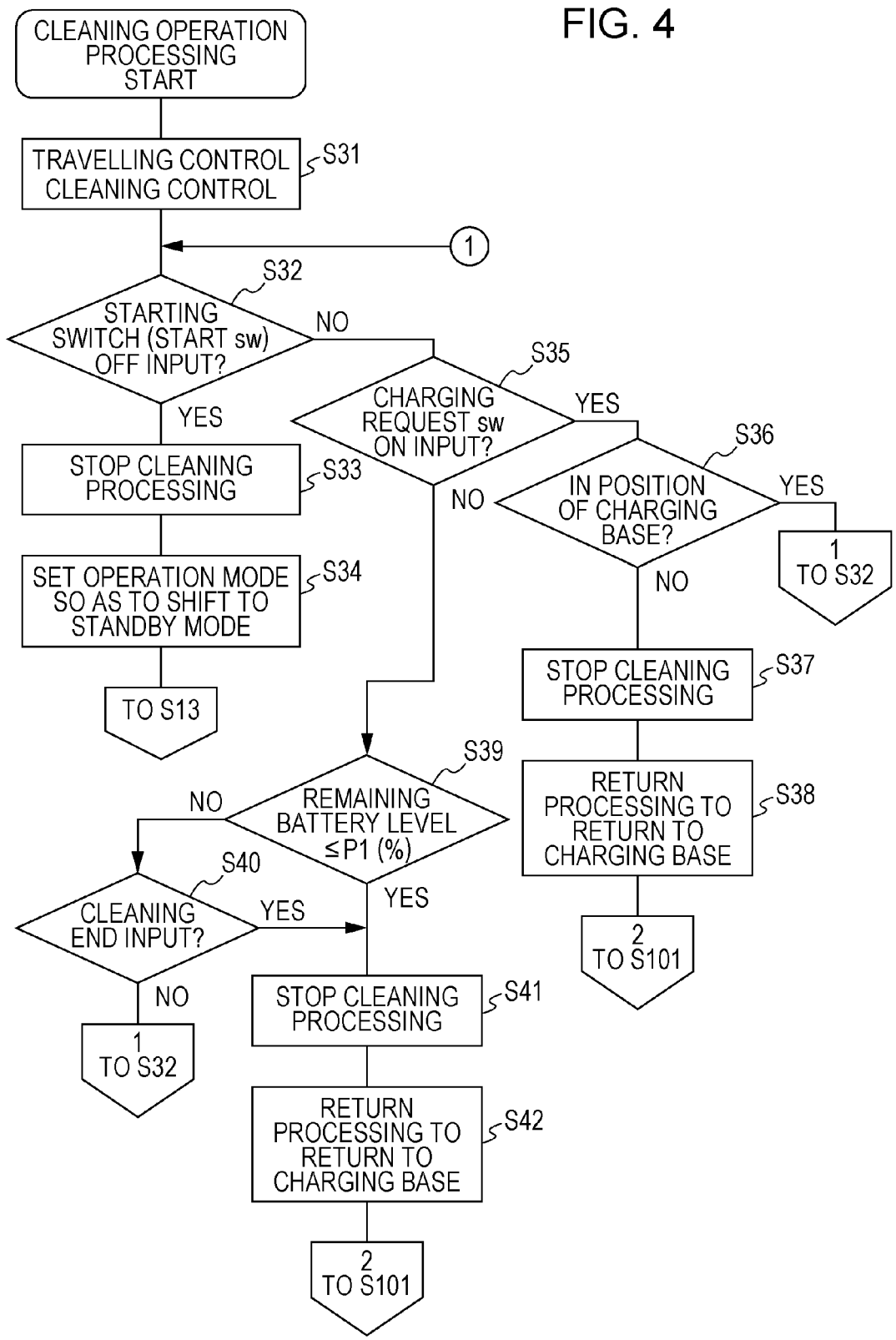
FIG. 4 is a flowchart of cleaning operation processing in the self-propelled vacuum cleaner of this invention.

Next, in FIG. 4, a detailed flowchart of the cleaning operation processing in step S12 is described.

In step S31 of FIG. 4, the control unit 11 performs travelling control by the travelling control unit 21 and cleaning control by the dust collector 15.

For example, cleaning processing by which the vacuum cleaner 1 sucks air therein through the inlet port 31 while moving at a constant speed to the right of the room R as depicted in FIG. 7, passes the air through the filter of the dust collector 15, and then discharges the air from the exhaust port 32 is performed.

Moreover, if an obstacle such as a desk is sensed by the obstacle sensor 14, processing by which the vacuum cleaner 1 moves while changing the travelling direction is repeatedly performed.

In step S32, it is checked whether or not an off (OFF) input of the start sw 53 is performed. If there is an OFF input, the procedure proceeds to step S33; if there is no OFF input, the procedure proceeds to step S35.

In step S33, the cleaning processing is stopped, and, since an OFF input of the start sw 53 is performed, in step S34, the operating mode information 71 is set so as to shift to the standby mode 73.

Then, the procedure proceeds to step S13, and, based on the determination made in step S13, the procedure goes back to step S4 in the standby mode 73.

In step S35, it is checked whether or not an on (ON) input of the charging sw 55 is performed.

If an ON input of the charging sw 55 is performed, it means that a charging request is made by the user.

If there is an ON input, the procedure proceeds to step S36; if there is no ON input, the procedure proceeds to step S39.

In step S36, based on the current position information 63, it is checked whether or not the vacuum cleaner 1 is currently in the position of the charging base 100. That is, it is checked whether or not the vacuum cleaner 1 is in a state in which the vacuum cleaner 1 remains connected to the charging base 100.

If the vacuum cleaner 1 is in the position of the charging base 100, the procedure goes back to step S32. That is, since the vacuum cleaner 1 remains connected to the charging base 100, charging is performed in that state.

In step S36, if the current position information 63 does not indicate the position of the charging base, the procedure proceeds to step S37.

In step S37, the cleaning processing is stopped. At this time, the vacuum cleaner 1 comes to rest in the current position.

In step S38, return processing to return to the charging base 100 is performed.

That is, since a charging request is input by the user when the vacuum cleaner 1 is in a position different from the position of the charging base, the vacuum cleaner 1 temporarily suspends cleaning and performs processing to return to the charging base 100 in order to charge the rechargeable battery. After this processing, the procedure proceeds to step S101 of FIG. 6.

Figure 5:
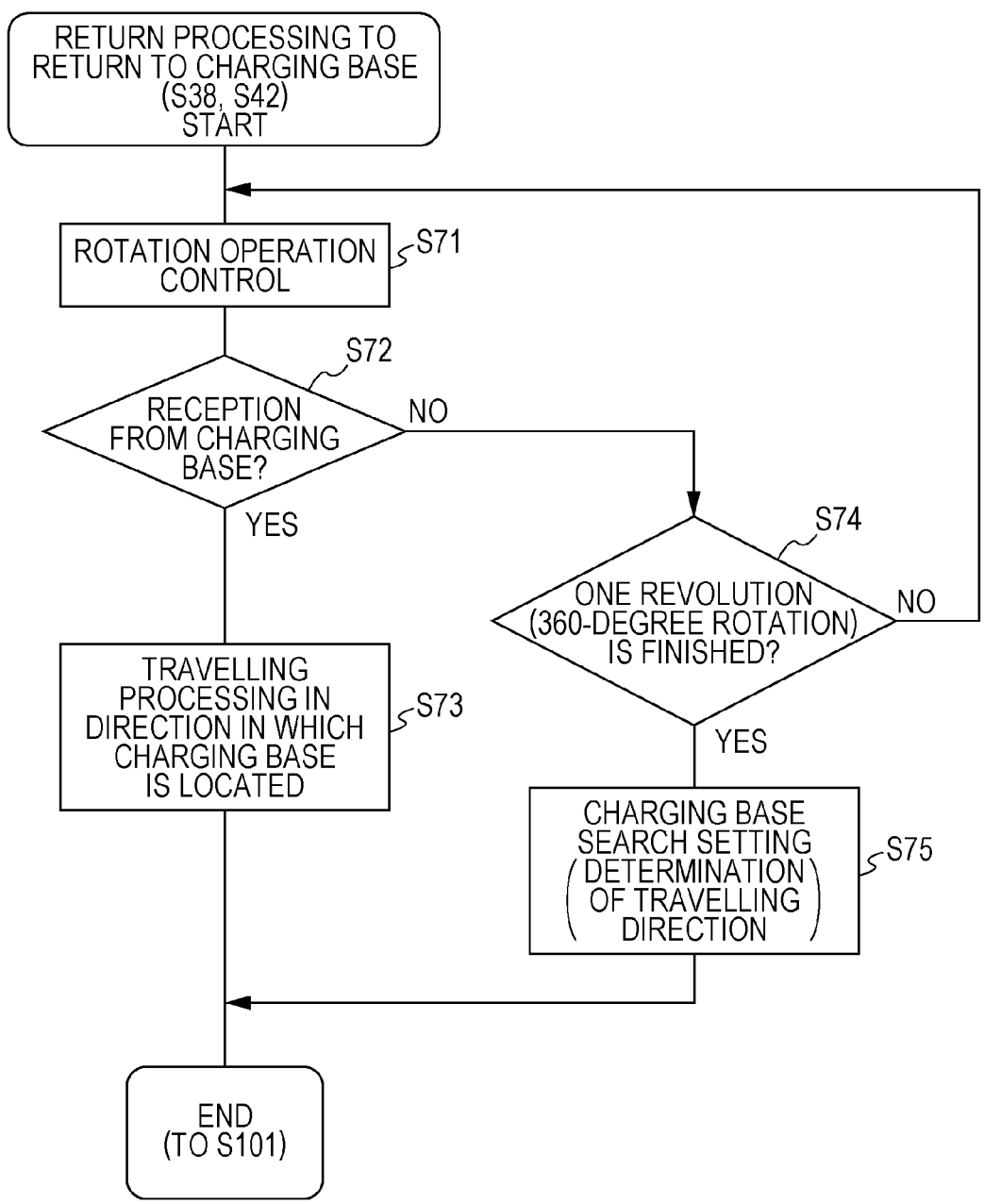
FIG. 5 is a flowchart of processing to return to a charging base in the self-propelled vacuum cleaner of this invention.

In FIG. 5, a detailed flowchart of an example of the return processing to return to the charging base in steps S38 and S42 is described.

In step S71 of FIG. 5, the vacuum cleaner 1 performs rotation operation control in a state in which the vacuum cleaner 1 is at rest in the current position. That is, the vacuum cleaner 1 operates the wheel in such a way that the wheel rotates there by making the pair of drive wheels of the wheel 22 rotate in opposite directions by the travelling control unit 21. In the rotation operation control, the vacuum cleaner 1 is rotated (is rotated 360 degrees at a maximum) at a predetermined rotation speed by using the front direction in which the current receiving portion 92 faces as an initial reference.

In step S72, it is checked whether or not reception of the infrared radiation from the charging base 100 has been performed (the infrared radiation from the charging base 100 has been received) by the receiving portion 92 while the above-described rotation operation is being performed.

If reception of the infrared radiation has been performed, the procedure proceeds to step S73; if the infrared radiation is not detected, the procedure proceeds to step S74.

If the infrared radiation is received by the receiving portion 92, it is recognized that the direction in which the charging base 100 lies is a front direction of the receiving portion 92.

Thus, in step S73, the rotation is stopped, and linear travelling processing is performed in the recognized direction in which the charging base 100 is located. Here, the travelling processing is performed in such a way that the vacuum cleaner 1 returns to the charging base as linearly as possible.

However, if there is an obstacle on the route, the vacuum cleaner 1 senses the obstacle by the obstacle sensor 14 and moves while adjusting the travelling route.

Moreover, if there is an obstacle, the vacuum cleaner 1 sometimes goes off the above-described linear route; therefore, it is preferable that the vacuum cleaner 1 continuously performs light receiving detection processing by the receiving portion 92 while moving.

In step S74, if the infrared radiation is not yet detected, it is checked whether or not one revolution (360-degree rotation) is finished. If one revolution is finished, the procedure proceeds to step S75; if one revolution is not yet finished, the procedure goes back to step S71.

In step S75, since the infrared radiation from the charging base 100 is not detected despite one revolution in the resting state, charging base search setting is made. Specifically, since the direction in which the charging base is located cannot be detected in the current resting position as depicted in FIG. 7, processing to determine a direction in which the vacuum cleaner 1 travels next is performed.

To determine the travelling direction, for example, as described earlier, it is necessary simply to move the vacuum cleaner 1 by a predetermined distance in the direction in which the receiving portion 92 faces, stop the vacuum cleaner 1 in that position, and execute the above-described detection control by rotation. After the travelling direction is determined, the procedure proceeds to step S101 of FIG. 6. In step S101, since a return direction cannot be detected, return processing of FIG. 5 is performed again.

The above is the description of an example of the return processing to return to the charging base of FIG. 5.

Incidentally, also in step S42 which will be described later, the same return processing is performed.

In step S35 of FIG. 4, if there is no ON input of the charging sw 55, in step S39, the remaining battery level of the rechargeable battery is checked.

Here, the control unit 11 makes the remaining battery level detecting unit 13 calculate the remaining capacity of the rechargeable battery 12.

It is checked whether or not the current remaining battery level is less than or equal to the predetermined first remaining level threshold value P1 (%) of the battery information 62 stored in advance in the storage unit 61.

As the first remaining level threshold value P1, a numeric value which serves as an indication of a sufficient remaining level that allows the vacuum cleaner 1 to return to the charging base 100 is set; for example, a numeric value of 19% is set.

If the remaining battery level P1 (%), the procedure proceeds to step S41; if not, the procedure proceeds to step S40.

If the remaining battery level is more than P1 (%), since there is a sufficient remaining battery level, the cleaning processing is continuously performed.

In step S40, it is checked whether or not an input indicating the end of cleaning is performed by the user. For example, it is checked whether or not an OFF input operation of the start sw 53 is performed.

If a cleaning end input is performed, the procedure proceeds to step S41; if not, the procedure goes back to step S32.

In step S41, if the remaining battery level is low or a cleaning end input is performed by the user, as in step S37, the cleaning processing is temporarily suspended.

In step S42, as in step S38, the return processing to return to the charging base is performed. Then, the procedure proceeds to step S101 of FIG. 6.

Figure 6:
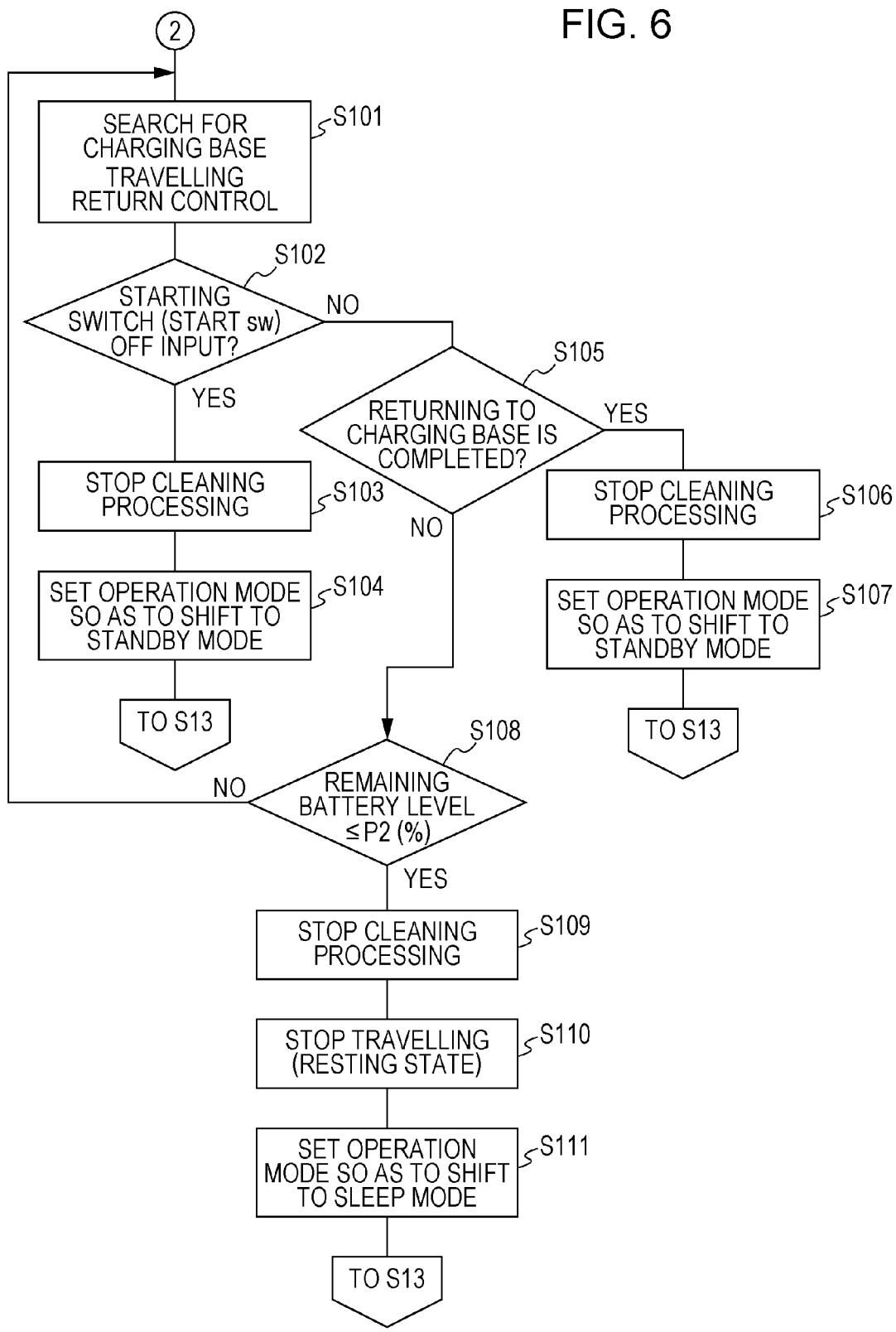
FIG. 6 is a flowchart of an example of processing in the self-propelled vacuum cleaner of this invention, the processing being performed until the self-propelled vacuum cleaner returns to the charging base.

In step S101 of FIG. 6, charging base search processing and travelling return control are performed to return to the charging base 100. Specifically, processing by which the vacuum cleaner 1 moves in the direction in which the charging base lies, the direction detected by the receiving portion 92, is performed, and, at the same time, detection processing to detect the infrared radiation emitted from the charging base 100 is continuously performed. As a result, the vacuum cleaner 1 gradually moves in the direction in which the charging base is located.

In step S102, it is checked whether or not an off (OFF) input of the start sw 53 is performed by the user.

If an OFF input of the start sw 53 is performed, the procedure proceeds to step S103; if not, the procedure proceeds to step S105.

In step S103, since an OFF input of the start sw 53 is performed by the user, the cleaning processing is stopped, and, in step S104, the operating mode information 71 is set so as to shift to the standby mode 73.

Then, the procedure goes back to step S13 of FIG. 3.

In step S105, it is checked whether or not the vacuum cleaner 1 has returned to the charging base 100. That is, it is checked whether or not the current position information 63 indicates the position of the charging base 100.

If it is determined that the vacuum cleaner 1 has returned to the charging base 100, the procedure proceeds to step S106; if not, the procedure proceeds to step S108.

In step S106, as in step S103, the cleaning processing is stopped, and, in step S107, the operating mode information 71 is set so as to shift to the standby mode 73. Then, the procedure goes back to step S13 of FIG. 3.

On the other hand, in step S108, it is checked whether or not the remaining battery level is less than or equal to the second remaining level threshold value P2 of the battery information stored in advance in the storage unit 61.

Here, as the second remaining level threshold value P2 (%), a value that is smaller than P1 described above is set, and, for example, setting is made such that P2=9(%) (P2<P1).

This threshold value P2 is a numeric value indicating that, if the remaining battery level becomes lower than P2, there is a possibility that the vacuum cleaner 1 cannot return to the charging base.

In step S108, if the remaining battery level≤P2, the procedure proceeds to step S109; if not, the procedure goes back to step S101 in order to continue processing to return to the charging base.

In step S109, the cleaning processing is stopped.

In step S110, the vacuum cleaner 1 stops travelling and comes to rest in the current position. That is, since the remaining battery level becomes less than or equal to the second remaining level threshold value (P2), the vacuum cleaner 1 determines that there is a possibility that the vacuum cleaner 1 cannot return to the charging base, gives up returning to the charging base, and remains in the current position.

In step S111, since the power by which the vacuum cleaner 1 returns to the charging base by travelling by itself becomes less than or equal to the predetermined value P2, the operating mode information 71 is set so as to shift to the sleep mode 74. Then, the procedure goes back to step S13 of FIG. 3.

In this case, since the vacuum cleaner 1 enters the resting state in a position different from that of the charging base 100, the user is made to return the vacuum cleaner 1 main body to the charging base 100.

Here, since, although the vacuum cleaner 1 needs charging, the vacuum cleaner 1 becomes unable to return to the charging base, it is desirable to perform alarm display informing the user of the necessity for charging or sound a beep by using the remaining power.

The above is the description of an example of the cleaning and travelling control of the vacuum cleaner of this invention and the return processing to return the vacuum cleaner to the charging base.

As described above, when a cause such as an insufficient remaining battery level makes it necessary for the vacuum cleaner to return to the charging base, since the vacuum cleaner comes to rest at the current position, rotates there, and searches for the direction in which the charging base is located, the vacuum cleaner can quickly find the position of the charging base to which the vacuum cleaner should return. Furthermore, as a result of the vacuum cleaner moving approximately linearly in the detected direction in which the charging base is located, it is possible to shorten the time the vacuum cleaner takes to return to the charging base.

Although the present invention has been described by taking up the self-propelled vacuum cleaner as an example, it goes without saying that the present invention can be applied to a self-propelled device that is provided with at least a charger and is subjected to travelling control. As the self-propelled device, an ion generating device that generates ions and releases the ions to the outside may be adopted. This makes it possible for the ion generating device to release the ions while travelling and thereby diffuse the generated ions all over the room. Moreover, by making the ion generating device travel to an arbitrary position, it is possible to implement ion generation locally in a position that requires ions. Furthermore, the present invention can also be applied, not only to the ion generating device, but also to an air cleaner that cleans the air and a robot that travels to an arbitrary position and meets the user's requirement.

REFERENCE SIGNS LIST 1 self-propelled vacuum cleaner
2 housing
2b top plate
2c side plate
3 lid portion
10 side brush
11 control unit
12 rechargeable battery
13 remaining battery level detecting unit
14 obstacle sensor
15 dust collector
21 travelling control unit
22 wheel
31 inlet port
32 exhaust port
51 input portion
52 power supply switch (power supply sw)
53 starting switch (start sw)
54 main power supply switch (main sw)
55 charging request switch
61 storage unit
62 battery information
63 current position information
70 stopped state
71 operating mode information
72 operation mode
73 standby mode
74 sleep mode
91 charging base searching unit
92 receiving portion
93 charging base connecting portion
100 charging base
101 vacuum cleaner connecting portion
102 transmitting portion
103 control unit
104 power supply portion
105 commercial power supply

The invention claimed is:

1. A self-propelled electronic device that is supplied with power from a charging base installed in a predetermined position and automatically travels to a position away from the charging base, the self-propelled electronic device comprising:
    a travelling control unit that makes the self-propelled electronic device move automatically by controlling a rotation of a wheel;
    a rechargeable battery that supplies power for performing travelling control during the automatic travelling;
    a charging base searching unit that searches for a position of the charging base;
    a control unit; wherein when the control unit determines that returning to the charging base is required, the control unit performs return processing by which the self-propelled electronic device is made to come to rest and then rotate in a resting state by the travelling control unit and, when the charging base searching unit searches for a direction in which the charging base lies and detects the direction in which the charging base lies, the self-propelled electronic device moves in the direction in which the charging base lies;
    a remaining battery level detecting unit that detects a remaining battery level of the rechargeable battery; and
    a storage unit that stores in advance battery information which is compared with the detected remaining battery level; wherein
    when the detected remaining battery level becomes less than or equal to a first remaining level threshold value P1 stored as the battery information, the control unit determines that returning to the charging base is required and performs the return processing.

2. The self-propelled electronic device according to claim 1, wherein
    when the remaining battery level detected by the remaining battery level detecting unit becomes less than or equal to a second remaining level threshold value P2 smaller than the first remaining level threshold value P1 while the self-propelled electronic device is automatically travelling, the control unit stops the travelling control and makes the self-propelled electronic device come to rest in a current position.

3. The self-propelled electronic device according to claim 1, further comprising:
    an input portion with a charging request switch to be used by a user to input a charging request; wherein
    when the charging request switch is depressed during the automatic travelling, the control unit determines that returning to the charging base is required and performs the return processing.

4. The self-propelled electronic device according to claim 3, wherein
    the input portion includes a starting switch for performing operation start and stop input, and
    when the starting switch is input during travelling, the control unit stops the travelling control.

5. The self-propelled electronic device according to claim 1, further comprising:
    a receiving portion that detects a signal transmitted from the charging base; wherein
    when the signal is detected by the receiving portion, the charging base searching unit recognizes that the charging base lies in a front direction of the receiving portion.

6. The self-propelled electronic device according to claim 1, wherein
    the self-propelled electronic device is a vacuum cleaner with a cleaning function or an ion generating device with an ion generating function.

* * * * *